May 14, 1963     C. D. GUTIERREZ     3,089,804
PROCESS AND APPARATUS FOR PRODUCING PLASTIC NET
Filed Oct. 31, 1961     2 Sheets-Sheet 1
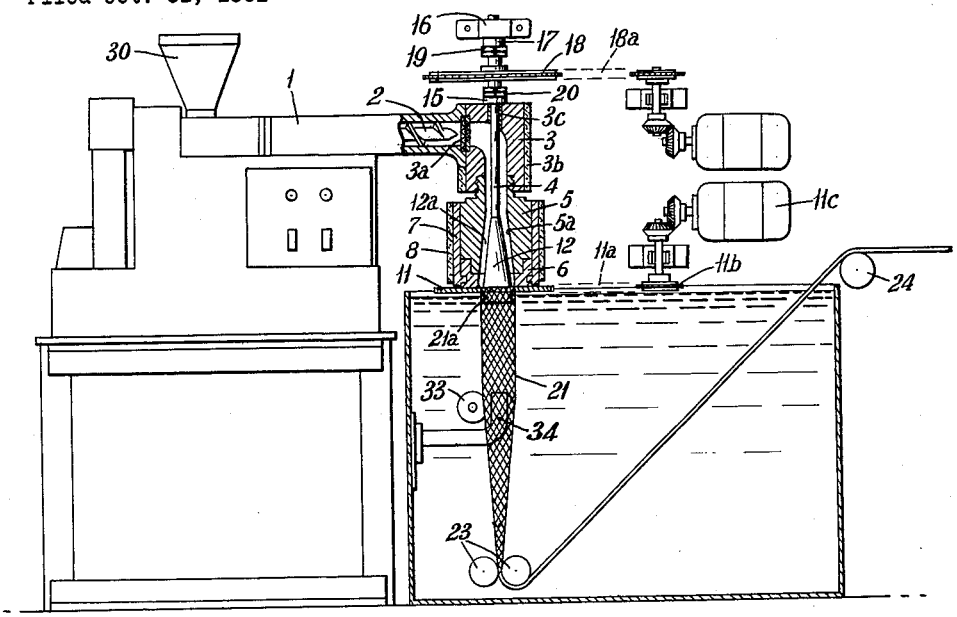
Fig. 1.
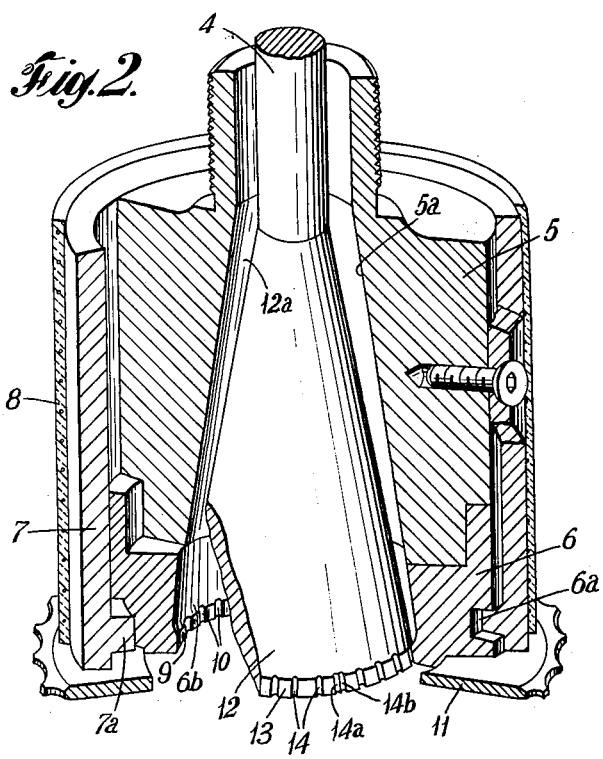
Fig. 2.
Fig. 3.
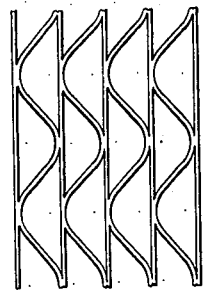
Fig. 4.
INVENTOR.
CARLOS D. GUTIERREZ
BY
Walter C. Kehm
ATTORNEY May 14, 1963  C. D. GUTIERREZ  3,089,804
PROCESS AND APPARATUS FOR PRODUCING PLASTIC NET
Filed Oct. 31, 1961  2 Sheets-Sheet 2

INVENTOR.
CARLOS D. GUTIERREZ
BY
ATTORNEY

United States Patent Office 3,089,804
Patented May 14, 1963

3,089,804
PROCESS AND APPARATUS FOR PRODUCING PLASTIC NET
Carlos D. Gutierrez, Middlesex, N.J., assignor to Union Carbide Corporation, a corporation of New York
Filed Oct. 31, 1961, Ser. No. 149,060
6 Claims. (Cl. 156—167)

The present invention relates generally to a process and apparatus for producing plastic net and, more particularly, to a process and apparatus for producing flat plastic net with finished edges from annular or circular arrangements of extrusion nozzles.

Heretofore, both tubular and flat plastic nets have been produced by the extrusion of plastic material from dies which conformed to the final net shape, i.e., tubular net from annular or circular dies and flat net from linear dies. In both types of dies, a uniform distribution of pressure and resin must be maintained over all the extrusion nozzles in order to produce strands of uniform thickness. However, in the case of linear dies, it is often difficult to attain the desired uniform distributions over the entire die length, and this difficulty becomes more pronounced as the strand gauge increases. As a result, it has become desirable to produce flat net from annular or circular extrusion dies. Of course, it is possible to produce flat net by merely slitting the tubular net, but such a process necessarily results in a net with at least one rough or unfinished edge.

It is, therefore, the main object of the present invention to provide a process and apparatus for producing flat plastic net with finished edges from annular or circular extrusion dies.

It is another object of the invention to provide an economical process for producing flat plastic net having uniform strand diameters and finished edges.

Other aims and advantages of the invention will be apparent from the following description and appended claims.

As used herein, the following terms have the following meanings:

The term "plastic mass" refers to:

(a) A synthetic thermoplastic resin capable of melt extrusion or compression extrusion in a molten state through dies and settable by a cooling medium on issuance from the dies. Suitable thermoplastic materials include polyamides or superpolyamides, such as nylon; polyesters; vinyl polymers such as vinyl acetate polymers, styrene polymers, acrylonitrile polymers, vinyl chloride polymers such as polyvinyl chloride and copolymers of vinyl chloride with other ethylenically unsaturated monomers such as vinyl acetate, vinylidine chloride, and like monomers; polyolefins such as polyethylene, polypropylene, and like thermoplastic polymers.

(b) Natural or synthetic rubbers, subsequently vulcanized or containing vulcanizing agents.

(c) Those thermosetting plastic materials or mixtures thereof with thermoplastic materials, which are capable of melt extrusion.

(d) Natural and synthetic fiber-forming materials extrudable from solvent solution, such as cuprammonium cellulose or protein material (e.g. from soya bean), cellulose acetate, as well as many thermoplastic resins such as are mentioned above, dissolved or dispersed in a solvent and capable of extrusion and setting by immersion in or spraying with a coagulant as the plastic mass emerges from the dies.

(e) Foamable compositions containing any of the above materials.

The term "extruded strand-forming streams" refers to the streams of plastic mass formed by the extrusion dies, regardless of whether such streams are within the extrusion dies or outside the extrusion dies.

The term "double strand-forming stream" refers to a pair of contiguous extruded strand-forming streams, which is treated as a single stream, or to a strip-forming stream at least as wide as two strand-forming streams.

The term "extrusion nozzle" refers to that portion of the extrusion apparatus which forms an extruded strand-forming stream. Each extrusion nozzle may be a separate tube or spout, or a plurality of extrusion nozzles may be present in a single integral extrusion die. The nozzle opening may be referred to as a slot, aperture, duct, orifice, vent, etc. A "double extrusion nozzle" is a nozzle which forms a double strand-forming stream and is treated as a single extrusion nozzle.

The term "tacky condition" refers to that degree of softness required to cause the adjacent strand-forming streams to fuse or stick together and remain together when the streams are subsequently separated.

In accordance with the present invention, a process and apparatus are provided for producing flat plastic net by extruding a plastic mass into a plurality of plastic strand-forming streams arranged in at least one circle, at least one of the strand-forming streams being a double strand-forming stream; imparting relative rotational movement to the strand-forming streams in a direction transverse to the direction of extrusion so as to periodically contact and separate adjacent strand-forming streams while the streams are in a tacky condition, thereby forming a tubular plastic net; and slitting the plastic net along the middle of the double strand-forming stream.

The extruded strand-forming streams may be arranged in a single circle or in two or more concentric circles. In either case, at least one of the extrusion nozzles is a double extrusion nozzle and at least one of the extruded strand-forming streams is a double strand-forming stream. The double strand-forming stream may be located in the same circle or circles as the single strand-forming streams, or the double strand-forming stream may be disposed on either side of or between the circle or circles of single strand-forming streams. The double extrusion nozzle produces a double strand in or on the resulting tubular net which can be slit in an axial direction to produce a flat net with finished edges. Since two finished edges can be produced wherever a double strand-forming stream is produced, it is obvious that more than one strip of flat net can be produced simultaneously from the same extrusion dies by employing more than one double extrusion die. Also, all the double extrusion nozzles need not be located in the same circle.

In the drawings:

FIG. 1 is an elevational view, partially in section, of a preferred form of extrusion apparatus embodying the present invention and located over a coolant tank and associated with a haul-off mechanism for the extruded net;

FIG. 2 is a fragmentary perspective view of the apparatus of FIG. 1;

FIG. 3 is a diagram of one of the many net patterns capable of being produced by the present invention;

FIG. 4 is a view of the faces of dies having closed extrusion nozzles, which can be used in the apparatus shown in FIGS. 1 and 2.

Figure 5:
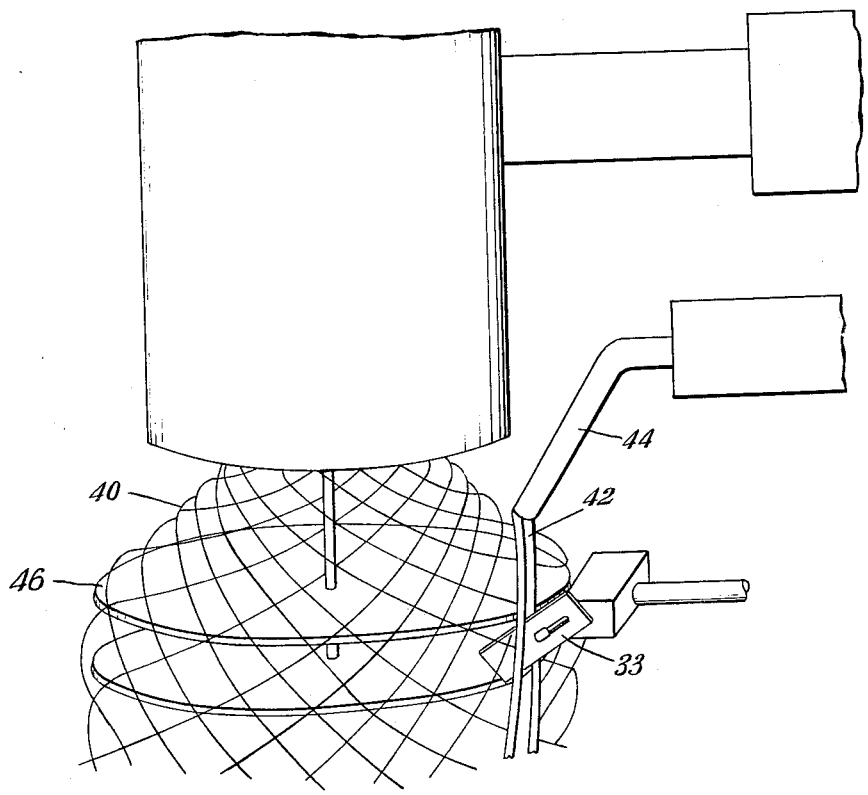
FIG. 5 is an elevation view of a modified form of extrusion apparatus embodying the present invention wherein the double strand-forming stream is located outside the circles of single strand-forming streams.

A preferred embodiment of the inventive process and apparatus will now be described in detail by referring to the drawings.

In FIGS. 1 and 2, there is illustrated an apparatus for carrying out the invention in a melt extrusion process in which concentric annular sets of extrusion nozzles are employed, and between which continuous relative rotational movement takes place transversely to the direction of extrusion of a synthetic thermoplastic resin. The thermoplastic material for extrusion is contained in a hopper 30. From the hopper 30 extends a suitably heated extruder barrel 1, in which an extruder screw 2 is mounted and continuously rotated to maintain a forced feed. The end of the conduit 1 discharges into a feed chamber 3 through a screen and breaker plate indicated at 3a. The chamber is surrounded by an electrically heated jacket 3b or other heating means which maintains the plastic mass delivered by the worm 2 at an appropriate extrusion temperature. The upper end of the chamber 3 has a gland and bearing 3c for a vertical rotatable shaft 4. The lower end of the chamber 3 is coupled to an extrusion chamber 5 by a screwthreaded neck or other suitable means for attachment. The two chambers 3 and 5 and conduit 1 are fixedly supported by a frame or base in any convenient manner.

The cavity of the chamber 5 has a conical wall 5a and supports an outer die-carrying member 6 in such a manner that the member 6 is capable of rotational movement about the axis of the shaft 4. For example, the lower end of the chamber 5 may be shaped to receive an upwardly directed annular flange provided on the die member 6, the externally peripheral wall of which is formed with a race groove 6a. A split cylinder or sleeve 7 is clamped around the chamber 5 and embracing the die member 6, thereby permitting the removal of the die member and replacement by another having a different set of dies.

The cylinder 7 is electrically or otherwise heated by a jacket 8 and has an annular rib or rail located in the groove 6a. The rib and groove serve as a guiding and supporting race for the rotating die member 6. The lower end of the inner peripheral wall 6b terminates in an annular bevelled or coned surface 9 in which a set of spaced extrusion nozzles 10 of suitable cross-sectional shape are formed. The die member 6 may be rotated or oscillated by any suitable means; for instance, it may have secured to its underside a chain wheel 11, the chain 11a of which is passed around another chain wheel 11b which is driven through gearing from a suitable source of power 11c.

The shaft 4 carries a replaceable inner or core-like die member 12 which co-operates with the outer die member 6. The inner die member is coned, preferably at slightly less steep angle than the conical wall 5a, such that the two conical wallings enclose an annular conical distributing passageway or cavity 12a for the plastic mass. The lower end of the conical member 12 terminates in an annular surface 13 which is coned exactly to accord with the coning of the surface 9 of the die member 6 and the two surfaces are carefully ground to a precise fit to provide relatively displaceable contacting edges or surfaces.

The surface 13 of the inner die member 12 has a set of spaced extrusion nozzles 14 therein opposite the nozzles 10 of the surface 9. In order to produce a double strand-forming stream which can be slit to form a flat net with finished edges, die member 12 is provided with a double extrusion nozzle having two contiguous slots 14a and 14b. The double strand-forming stream formed by the double extrusion nozzle is continuously split between the two strands by a slitting wheel or knife 33. A mandrel 34 disposed within the extruded net opposite the slitting knife 33 presses the net firmly against the knife to insure a continuous slit in the net. When the double extrusion nozzle is located in the inner die member and the relative rotational movement of the two die members is effected by rotating the outer die member while maintaining the inner die member stationary, the double strand is extruded in a straight vertical path and the slitting knife is stationary, as shown in FIG. 1. When the relative rotational movement is effected by rotating the die member containing the double extrusion nozzle or by rotating both die members, the double strand is extruded in a helical path and the slitting knife must be continuously rotated around the circumference of the tubular net. Similarly, when the die member containing the double extrusion nozzle is oscillated, the slitting knife is also oscillated. The rotational speed and direction of the knife is obviously dependent on the speed of rotation of the die member containing the double extrusion nozzle, and may be controlled by attaching the knife to that die member. The slitting knife is positioned so that the cutting edge follows the groove along the middle of the double strand-forming stream so that the strands formed by slots 14a and 14b from the finished edges of the flat net.

If it is desired to produce more than one strip of flat net from the same apparatus, more than one double extrusion nozzle may be employed. Of course, a separate slitting knife must be provided for each double strand-forming stream.

The openings of the extrusion nozzles 10 and 14 in the illustrated embodiment are in the form of grooves or slots which are mutually open when traversing each other during rotational oscillation of the die-carrying members 6 and 12, and are cut off from one another when traversing the ground surface of the slideways intervening between the spaced slots. Alternatively, the extrusion nozzles 10 and 14 can be set back from the surfaces 9 and 13 such that each nozzle opening is continuously cut off from the others, as shown in FIG. 5. In such a case, the net would be formed by crossing or contacting the extruded strand-forming streams at the die face or a predetermined distance away from the die face, rather than within the dies.

The shaft 4 is hung on a ball or roller thrust race 15 above the bearing 3c of the feed chamber 3, and the upper extremity of the shaft is steadied in a bearing 16. A second thrust race is provided at 17. Between the two races a chain wheel 18 is pinned to the shaft 4 as a convenient means for imparting rotational movement to the shaft 4 and die member 12. The chain 18a may be driven by the same source which drives chain 11a, or by a different source. On each side of the chain wheel 18 the shaft is screw-threaded for pairs of die-setting lock nuts 19 and 20. By the relative adjustment of these nuts, the appropriate sliding engagement is maintained between the contacting edges or surfaces of the surfaces 9 and 13. Since these surfaces are coned, the mating thereof is substantially perfect and can be so maintained during wear by axial adjustment of the shaft 4.

In operation, the plastic mass is forced by the worm 2 from the pipe 1 in a suitably molten state into the feed chamber 3 and therefrom through the conical annular passageway 12a. As the plastic mass arrives at the upper ends of the two sets of extrusion nozzles 10 and 14, it is forced therethrough and is continuously extruded through the lower ends of the orifice of the dies. When the two sets of extrusion nozzles traverse one another, confluent streams of the plastic mass issue in common through the paired dies; the common streams are subsequently cut or divided with a shearing action as the nozzles 10 and 14 separate and begin to traverse the blank contacting portions of the surfaces 9 and 13 which intervene between the nozzle openings of each set. During the traversing period of the two sets of nozzles, integral intersections of the meshes of the net are produced, while during the non-traversing period each set of dies produces the strands or legs of meshes. The cross-sectional area of the intersections is usually substantially double, or at least greater than, that of the mesh strands.

In the apparatus shown in the drawings, the relative rotational movement may be effected in any of the following ways:

(1) The die-carrying members may continuously rotate in opposite directions at the same or different speeds.

(2) The members may be rotated in the same direction but at different speeds.

(3) The members may be rotated according to (1) or (2) but with a stepwise movement or with varying speeds.

(4) The members may be oscillated so that the opposing nozzles periodically cross each other.

(5) One of the members may be held stationary while the other is rotated or oscillated.

Regardless of how the relative rotational movement is effected, the slitting knife should always follow the movement of the member carrying the double extrusion nozzle, both in speed and direction.

The extruded net is usually subjected to a setting or fixing treatment, as by extrusion into air or by immersing in a cooling liquid immediately below the extrusion dies. Referring to FIG. 1, the aforedescribed extrusion apparatus is mounted over a bath of cooling liquid, which may be water or other liquid appropriate for setting the particular plastic mass being employed. Within the cooling bath or associated therewith, haul-off rolls or equivalent means are provided to take up the net. The extruded net 21 is drawn over a mandrel 21a calculated to ensure an even haul-off and then passed through rollers 23 and pulled off as flat net over a roller 24 to a suitable collecting means (not shown).

A modified form of the invention wherein the double strand-forming stream is disposed outside the circles of single strand-forming streams is illustrated in FIG. 5. Referring to FIG. 5, a tubular plastic net 40 is extruded as described above with reference to FIGS. 1 through 4, with the single exception that the tubular net 40 contains no double strands. In this case, a double strand-forming stream 42 is extruded onto the outer surface of the tubular net 40 from a double extrusion nozzle 44. Of course, the double stream 42 should be in a tacky condition when it contacts the net 40. The double extrusion nozzle 44 may be fed from the same extruder which feeds the net-producing dies, or from a separate extruder where it is desired to produce a double strand-forming stream of a different color or composition. Although the double strand-forming stream 42 is shown to be in the form of a pair of contiguous single strands, it may be in the form of a strip or any other shape having a width of at least two single strand-forming streams. After the double stream 42 has been bonded to the tubular net 40, both the double stream 42 and the net fibers bonded thereto are continuously slit by a slitting knife 33, as described above for FIG. 1. A mandrel 46 disposed within the tubular net opposite the slitting knife 33 presses the net firmly against the knife to insure a continuous slit in the net. It should be clear that the double strand-forming stream 42 could be extruded onto the inner surface of the tubular net rather than the outer surface thereof. Also, the tubular net may be formed from single strand-forming streams arranged in either a single circle or one or more concentric circles.

It is, of course, to be understood that other extrudable fiber-forming plastic materials, such as those heretofore set forth, can be handled in like manner with obvious modifications of the above procedure as will occur to those skilled in the art of such materials.

While various specific forms of the present invention have been illustrated and described herein, it is not intended to limit this invention to any of the details herein shown. For example, as mentioned above, the extrusion nozzles may be arranged in a single circle rather than two or more concentric circles. The plastic mass should always be of such a nature that fibers thereof will adhere to each other. The strands may be of any cross-sectional shape, e.g., round, square, oblong, dog-bone, or any other suitable shape desired.

What is claimed is:

1. A process for producing flat plastic net having finished edges comprising extruding a plastic mass into a plurality of plastic strand-forming streams arranged in at least one circle, at least one of said strand-forming streams being a double strand-forming stream; imparting relative rotational movement to said strand-forming streams in a direction transverse to the direction of extrusion so as to periodically contact and separate adjacent strand-forming streams while said streams are in a tacky condition, thereby forming a tubular plastic net; and slitting said tubular plastic net along the middle of said double strand-forming stream.

2. A process for producing flat plastic net having finished edges comprising extruding a plastic mass into a first set of plastic strand-forming streams arranged in a first circle and a second set of plastic strand-forming streams arranged in a second circle concentric to said first circle, at least one of said strand-forming streams being a double strand-forming stream; imparting relative rotational movement to said first and second sets of streams in a direction transverse to the direction of extrusion so as to periodically contact and separate adjacent strand-forming streams while said streams are in a tacky condition, thereby forming a tubular plastic net; and slitting said tubular plastic net along the middle of said double strand-forming stream.

3. A process for producing flat plastic net having finished edges comprising extruding a plurality of plastic strand-forming streams arranged in at least one circle; imparting relative rotational movement to said strand-forming streams in a direction transverse to the direction of extrusion so as to periodically contact and separate adjacent strand-forming streams while said streams are in a tacky condition, thereby forming a tubular plastic net; extruding at least one double strand-forming stream onto a surface of said tubular net while said double strand-forming stream is in a tacky condition; and slitting said double strand-forming stream and said tubular net along the middle of said double strand-forming stream.

4. Apparatus for producing flat plastic net comprising a plurality of extrusion nozzles arranged in at least one circle, at least one of said extrusion nozzles being a double extrusion nozzle; means for supplying said nozzles with a plastic mass; means for imparting relative rotational movement to said nozzles in a direction transverse to the direction of extrusion whereby adjacent strand-forming streams formed by said nozzles are periodically contacted and separated so as to form a plastic net; and means for slitting said plastic net along the middle of the double strand-forming stream formed by said double extrusion nozzle.

5. Apparatus for producing flat plastic net having finishing edges comprising a first set of extrusion nozzles arranged in a first circle and a second set of extrusion nozzles arranged in a circle concentric to the first circle of nozzles, at least one of said nozzles being a double extrusion nozzle; means for supplying said nozzles with a plastic mass; means for imparting relative rotational movement to said nozzles in a direction transverse to the direction of extrusion whereby adjacent strand-forming streams formed by said extrusion nozzles are periodically contacted and separated so as to form a tubular plastic net; and means for slitting said tubular plastic net through the double strand-forming stream formed by said double extrusion nozzle.

6. Apparatus for producing flat plastic net comprising a plurality of extrusion nozzles arranged in at least one circle; at least one double extrusion nozzle disposed outside said circle; means for supplying said nozzles with a molten plastic mass; means for imparting relative rotational movement to said nozzles arranged in at least one circle in a direction transverse to the direction of extrusion whereby adjacent strand-forming streams formed by said nozzles are periodically contacted and separated so as to form a tubular plastic net, said double extrusion nozzle being disposed sufficiently close to said tubular net to extrude a double strand-forming stream onto the outer surface thereof; and means for slitting said double strand-forming stream and said tubular net along the middle of said double strand-forming stream.

References Cited in the file of this patent
UNITED STATES PATENTS

| | | |
|---|---|---|
| 567,948 | Bracher | Sept. 15, 1896 |
| 2,119,081 | Knowland | May 31, 1938 |
| 2,766,504 | Beeby | Oct. 16, 1956 |
| 2,840,117 | Scruggs | June 24, 1958 |
| 2,919,467 | Mercer | Jan. 5, 1960 |
| 3,025,196 | Burger | Mar. 13, 1962 |